(12) United States Patent
Lee et al.

(10) Patent No.: US 6,857,043 B1
(45) Date of Patent: Feb. 15, 2005

(54) SHIFT REGISTER IMPLEMENTATIONS OF FIRST-IN/FIRST-OUT MEMORIES UTILIZING A DOUBLE INCREMENT GRAY CODE COUNTER

(75) Inventors: Andy L. Lee, San Jose, CA (US); Brian Johnson, Sunnyvale, CA (US); Richard G. Cliff, Los Altos, CA (US)

(73) Assignee: Altera Corporation, San Jose, CA (US)

( * ) Notice: Subject to any disclaimer, the term of this patent is extended or adjusted under 35 U.S.C. 154(b) by 438 days.

(21) Appl. No.: 09/761,609

(22) Filed: Jan. 16, 2001

Related U.S. Application Data
(60) Provisional application No. 60/200,644, filed on Apr. 28, 2000.

(51) Int. Cl.[7] ............................................. G06F 12/00
(52) U.S. Cl. ........................ 711/109; 711/219; 377/34; 377/54; 710/57; 365/221; 341/98; 713/400
(58) Field of Search .............................. 711/109, 110, 711/216–218, 156; 377/34, 52, 54, 108; 341/98; 365/221, 189.07; 710/57, 52; 713/400

(56) References Cited

U.S. PATENT DOCUMENTS

| | | | | |
|---|---|---|---|---|
| 4,833,651 A | * | 5/1989 | Seltzer et al. | 365/189.07 |
| 5,084,841 A | * | 1/1992 | Williams et al. | 365/189.07 |
| 5,212,652 A | * | 5/1993 | Agrawal et al. | 364/489 |
| 5,343,406 A | * | 8/1994 | Freeman et al. | 364/490 |
| 5,352,940 A | * | 10/1994 | Watson | 307/465 |
| 5,414,377 A | * | 5/1995 | Freidin | 326/41 |
| 5,426,756 A | * | 6/1995 | Shyi et al. | 711/159 |
| 5,432,719 A | * | 7/1995 | Freeman et al. | 364/579 |
| 5,488,316 A | * | 1/1996 | Freeman et al. | 326/41 |
| 5,550,782 A | * | 8/1996 | Cliff et al. | 365/230.03 |
| 5,555,524 A | * | 9/1996 | Castellano | 365/221 |
| 5,566,123 A | * | 10/1996 | Freidin et al. | 365/230.05 |
| 5,572,148 A | * | 11/1996 | Lytle et al. | 326/41 |
| 5,631,577 A | * | 5/1997 | Freidin et al. | 326/40 |
| 5,648,732 A | * | 7/1997 | Duncan | 326/40 |
| 5,689,195 A | * | 11/1997 | Cliff et al. | 326/41 |
| 5,758,192 A | * | 5/1998 | Alfke | 395/877 |
| 5,809,521 A | * | 9/1998 | Steinmetz et al. | 711/116 |
| 5,889,413 A | * | 3/1999 | Bauer | 326/40 |
| 5,898,893 A | * | 4/1999 | Alfke | 395/877 |
| 5,926,036 A | * | 7/1999 | Cliff et al. | 326/40 |
| 6,049,223 A | * | 4/2000 | Lytle et al. | 326/40 |
| 6,101,329 A | * | 8/2000 | Graef | 710/52 |
| 6,263,410 B1 | * | 7/2001 | Kao et al. | 711/156 |
| 6,304,936 B1 | * | 10/2001 | Sherlock | 710/305 |
| 6,314,154 B1 | * | 11/2001 | Pontius | 377/16 |
| 6,337,893 B1 | * | 1/2002 | Pontius | 377/108 |
| 6,411,124 B2 | * | 6/2002 | Lee et al. | 326/41 |
| 6,434,642 B1 | * | 8/2002 | Camilleri et al. | 710/57 |

OTHER PUBLICATIONS

M. Morris Mano, Computer System Architecture, Prentice Hall, Inc., 1976, pp 97–98.*
U.S. Appl. No. 09/007,718, filed Jan. 15, 1998, Zaveri et al.*
U.S. Appl. No. 09/266,235, filed Mar. 10, 1999, Jefferson et al.*

(List continued on next page.)

*Primary Examiner*—Hong Kim
(74) *Attorney, Agent, or Firm*—Fish & Neave LLP

(57) ABSTRACT

First-in/first-out ("FIFO") memory circuitry includes first and second Gray-code-based counters for respectively counting write and read clock signals. A Gray code subtractor subtracts from one another the counts output by the counters. Shift register circuitry shifts in successive data words in synchronism with the write clock signal. The shift register circuitry includes selection circuitry configured to select one of the data words based on a Gray code decoding of information from the subtractor. Circuitry may also be included to monitor the information from the subtractor to detect full or empty conditions of the shift register circuitry.

33 Claims, 7 Drawing Sheets

OTHER PUBLICATIONS

P. Chow et al., "A 1.2μ m CMOS FPGA using Cascaded Logic Blocks and Segmented Routing", *FPGAs*, Chapter 3.2, pp. 91–102, W.R. Moore and W. Luk (eds.), Abingdon EE&CS Books, Abingdon, (UK), 1991.

L. Mintzer, "FIR Filters with the Xilinx FPGA", FPGA '92 #129–#134.

"Optimized Reconfigurable Cell Array (ORCA) Series Field–Programmable Gate Arrays", Advance Data Sheet, AT&T Microelectronics, Feb. 1993, pp. 1–36 and 65–87.

*The Programmable Logic Data Book*, 1994, Xilinx Inc., San Jose, CA, cover pages and pp. 2–5 through 2–102 ("XC4000 Logic Cell Array Families").

B. Klein, "Use LFSRs to Build Fast FPGA–Based Counters", Electronic Design, Mar. 21, 1994, pp. 87, 88, 90, 94, 96, 97, and 100.

A. DeHon, "Reconfigurable Architectures for General–Purpose Computing", M.I.T. Ph.D. thesis, Sep. 1996.

R. Iwanczuk, "Using the XC4000 RAM Capability", XAPP 031.000, Xilinx, Inc., San Jose, CA.

J.R. Hauser et al., "Garp: A MIPS Processor with a Reconfigurable Coprocessor", 0–8186–8159–4/97 $10.00 © 1997 IEEE, pp. 12–21.

A. Ohta et al., "New FPGA Architecture for Bit–Serial Pipline Datapath", 0–8186–8900–5/98 $10.00 © 1998 IEEE, pp. 58–67.

"XC4000E and XC4000X Series Field Programmable Gate Arrays; Product Specification", May, 14, 1999 (Version 1.6), Xilinx Inc., San Jose, CA, pp. 6–5 through 6–72.

"Flex 10K Embedded Programmable Logic Family", Data Sheet, Jun. 1999, ver. 4.01, Altera Corporation, San Jose, CA, pp. 1–137.

"Flex 10KE Embedded Programmable Logic Family", Data Sheet, Aug. 1999, ver. 2.02, Altera Corporation, San Jose, CA, pp. 1–120.

"XC4000XLA/XV Field Programmable Gate Arrays; Product Specification", DS015 (v1.3) Oct. 18, 1999, Xilinx Inc., San Jose, CA, pp. 6–157 through 6–170.

"Triscend E5 Configurable System–on–Chip Family", Triscend Corporation, Jan. 2000 (Version 1.00) Product Description, cover page and pp. 25–28.

"Apex 20K Programmable Logic Device Family", Data Sheet, Mar. 2000, ver. 2.06, Altera Corporation, San Jose, CA, pp. 1–208.

"Virtex 2.5V Field Programmable Gate Arrays", DS003 (v. 2.0), Preliminary Product Specification, Mar. 9, 2000, Xilinx, Inc., San Jose, CA, pp. 1–72.

"Virtex™–E 1.8V Extended Memory Field Programmable Gate Arrays", DS025 (v1.0) Mar. 23, 2000, Advance Product Specification, Xilinx Inc., San Jose, CA, pp. 1 and 6.

* cited by examiner

| GRAY CODE WORD | | | | EQUIVALENT DECIMAL VALUE |
| --- | --- | --- | --- | --- |
| D (MSB) | C | B | A (LSB) | |
| *0 | 0 | 0 | 0 | 0 |
| 0 | 0 | 0 | *1 | 1 |
| 0 | 0 | *1 | 1 | 2 |
| 0 | 0 | 1 | *0 | 3 |
| 0 | *1 | 1 | 0 | 4 |
| 0 | 1 | 1 | *1 | 5 |
| 0 | 1 | *0 | 1 | 6 |
| 0 | 1 | 0 | *0 | 7 |
| *1 | 1 | 0 | 0 | 8 |
| 1 | 1 | 0 | *1 | 9 |
| 1 | 1 | *1 | 1 | 10 |
| 1 | 1 | 1 | *0 | 11 |
| 1 | *0 | 1 | 0 | 12 |
| 1 | 0 | 1 | *1 | 13 |
| 1 | 0 | *0 | 1 | 14 |
| 1 | 0 | 0 | *0 | 15 |

SHIFT REGISTER IMPLEMENTATIONS OF FIRST-IN/FIRST-OUT MEMORIES UTILIZING A DOUBLE INCREMENT GRAY CODE COUNTER

This application claims the benefit of provisional patent application No. 60/200,644, filed Apr. 28, 2000, which is hereby incorporated by reference herein in its entirety.

BACKGROUND OF THE INVENTION

This invention relates to first-in/first-out ("FIFO") memories, and more particularly to implementing such memories using shift registers, for example, in a programmable logic device.

FIFO memories can be used to help transfer data between two different clock regimes that may not be synchronized with one another. For example, data may be received in synchronism with a so-called "write clock" and may require further processing in the order received but in synchronism with a so-called "read clock" which is different from and perhaps not even synchronized with the write clock. A FIFO memory may therefore be used as a data buffer between the circuitry associated with the write clock and the circuitry associated with the read clock. The FIFO memory takes in data in synchronism with the write clock, and the currently oldest data is read out in synchronism with the read clock.

Generally, a FIFO memory must be equipped with circuitry to detect full and empty conditions of the memory. When the memory is full, writing must be stopped (e.g., to prevent loss of data). When the memory is empty, reading must be stopped (e.g., to prevent the reading circuitry from erroneously operating on null data). Full and empty conditions can be detected by counting read and write clock pulses and comparing (e.g., subtracting) those counts. If the write clock pulse count exceeds the read clock pulse count by an amount equal to the capacity of the FIFO memory, the memory is full and further writing should be stopped. If the read clock pulse count is equal to the write clock pulse count, the FIFO memory is empty and further reading should be stopped. Of course writing or reading can be resumed as soon as the FIFO memory is no longer full or empty.

When the read and write clocks are not synchronized with one another, the counts of read and write clock pulses are also not synchronized with one another and it can be difficult to reliably detect full and empty conditions by comparing those counts.

SUMMARY OF THE INVENTION

In accordance with the present invention Gray code counter circuitries are used to count both the read and write clocks. Gray code subtractor circuitry is used to process the Gray code outputs of the counters to produce a Gray code output which is used to address shift register circuitry for reading. Data is shifted into the shift register circuitry in synchronism with the write clock and is read from the shift register circuitry location identified by the Gray code output of the Gray code subtractor. Certain Gray code subtractor outputs indicate that the shift register circuitry is either full or empty. By using Gray code in this manner, a FIFO memory can be provided which has reliable and glitch-free full, empty, and data output signals. The circuitry can be readily implemented in appropriately constructed programmable logic devices ("PLDs"), e.g., PLDs that include Gray code shift register capabilities.

Further features of the invention, its nature and various advantages, will be more apparent from the accompanying drawings and the following detailed description.

BRIEF DESCRIPTION OF THE DRAWINGS

FIG. 2 is a table that is useful in explaining certain aspects of the construction and operation of the FIG. 1 circuitry in accordance with the invention.

DETAILED DESCRIPTION

Figure 1:
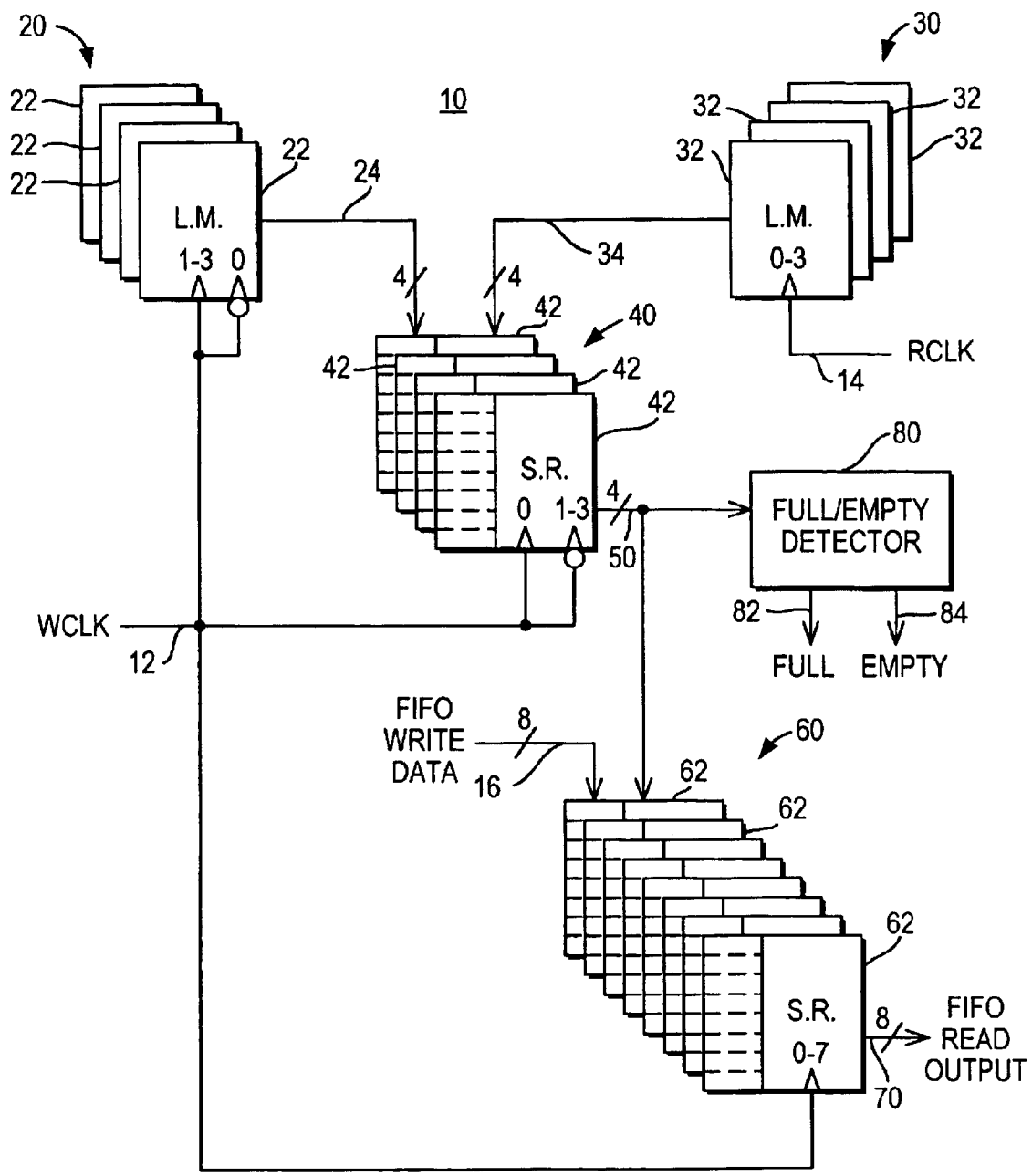
FIG. 1 is a simplified schematic block diagram of an illustrative FIFO memory constructed in accordance with the invention.

An illustrative FIFO memory 10 constructed in accordance with this invention is shown in FIG. 1. FIFO memory 10 receives a write clock signal ("WCLK") via lead 12 and a read clock signal ("RCLK") via lead 14. The WCLK and RCLK signals do not need to be synchronized with one another in any respect. In the embodiment being discussed, however, it is assumed that after any "clear" control signal is deasserted, the first edge of a "clock" signal is a rising edge. It is also assumed that a "clear" control signal clears components in FIG. 1 to the following values: circuitry 20 is cleared to 0001, circuitry 30 is cleared to 0001, circuitry 40 is cleared to zero, and circuitry 60 is cleared to zero. (These assumptions are only illustrative, and other assumptions and combinations of operating parameters can be used in other implementations that are within the scope of this invention.)

In addition to the WCLK and RCLK signals, FIFO memory 10 receives eight bits of parallel data ("FIFO WRITE DATA") via eight leads 16, and outputs eight bits of parallel data ("FIFO READ OUTPUT") via eight leads 70. Successive eight-bit words of FIFO WRITE DATA are applied to FIFO memory 10 in synchronism with successive WCLK signal pulses. The oldest word of data in the FIFO memory 10 that was not read during a previous RCLK signal cycle is read out via leads 70 during each successive RCLK signal cycle. FIFO memory 10 has the capacity to store as many as eight, eight-bit data words. These word length and memory capacity parameters are only illustrative, and it will be readily apparent from the following discussion how these parameters can be increased or decreased if desired.

In FIG. 1 the elements indicated by reference number 20 constitute Gray code counter circuitry for counting successive WCLK signal pulses and producing four output signals on leads 24 that are indicative of the current count in a Gray code. As is well known, a Gray code is one in which only one binary digit ("bit") or place changes value when moving from any word to the next higher or lower word in the sequence of Gray code words. For example, FIG. 2 shows an example of a four-bit Gray code accompanied by a decimal equivalent value for each Gray code word. Each of the 16 Gray code words is unique. The most significant bit ("MSB") "D" of each Gray code word is shown on the left, and the least significant bit ("LSB") "A" is shown toward the right. In each Gray code word the single bit that changes when moving from the preceding (lower decimal valued) word is indicated by an asterisk. (This includes moving from the bottom-most word in FIG. 2 to the top-most word.) As has been said, the rule that only one bit changes in value when moving to the adjacent word is equally applicable when moving up the Gray code sequence. The particular Gray code shown in FIG. 2 is only illustrative. There are other known Gray codes, and any Gray code can be used in connection with this invention. As is well known, a Gray code has the advantage that the state of only one bit position is momentarily uncertain when going from one Gray code word to the next successive Gray code word (forward or backward).

Returning to FIG. 1, Gray code counter 20 can be implemented in any of a variety of ways (e.g., as a finite state machine outputting the desired Gray code sequence in response to successive WCLK signal cycles). However counter 20 is implemented, the output signals should be free of "glitches" (i.e., momentarily erroneous or indefinite states). FIG. 1 shows an embodiment that may be particularly desirable when FIFO memory 10 is implemented on an appropriately constructed programmable logic device. (An example of a programmable logic device suitable for use in implementing this and all other portions of FIFO memory 10 is shown in commonly assigned, concurrently filed U.S. patent application Ser. No. 09/761,602, now U.S. Pat. No. 6,411,124, which is hereby incorporated by reference herein in its entirety. Programmable logic device implementation of FIFO memory 10 is further discussed later in this specification.) In the embodiment shown in FIG. 1 four logic modules 22 on the programmable logic device are programmed to count successive WCLK signal pulses and to produce a Gray code output 24 indicative of the count. In particular, each of logic modules 22 produces a respective one of the four-bits of the successive Gray code output words.

Counter 20 is preferably configured so that it successively outputs two successive Gray code values in response to each WCLK signal cycle. Considering again the illustrative Gray code shown in FIG. 2, it will be noted that the A or LSB place of that code alternates between logic 1 for two successive words and then logic 0 for the next two successive words. Moreover, the changes in state of the A or LSB bit are all interleaved between changes in state in the other bits (B–D) considered collectively. Accordingly, the Gray code shown in FIG. 2 can be readily produced by having the A or LSB bit clocked by the inverse of the WCLK signal, while the other bits (B–D) are clocked by and appropriately count pulses in the uninverted WCLK signal. Consistent with this description, counter 20 is shown in FIG. 1 receiving both the true and complement of the WCLK signal. (In particular, as indicated by the "0" in FIG. 1, the logic module 22 producing the LSB receives the inverted WCLK signal, and as indicated by the "1–3" in FIG. 1, the three logic modules 22 producing the more significant bits receive the true of the WCLK signal.) In effect, counter 20 is counting at twice the WCLK rate. Because the maximum capacity of FIFO memory 10 is eight words, and because counter 20 is counting at twice the WCLK rate, counter 20 is a recirculating counter having 16 different Gray code output states (e.g., the 16-word Gray code sequence shown in FIG. 2, with the bottom-most state being succeeded by return to the top-most state). (It will be remembered that whenever counter 20 is cleared, it clears to 0001.)

Counter 30 is another counter based on the same Gray code as counter 20. Counter 30 counts RCLK signal pulses. Unlike counter 20, however, counter 30 preferably counts only at the basic RCLK rate, not at twice that rate. Also unlike counter 20, the outputs of counter 30 increment by two Gray code increments in response to each successive RCLK cycle. The intervening Gray code words are skipped. The output signals of counter 30 are therefore not a true Gray code, but they are based on a Gray code, (in particular the Gray code implemented by counter 20). Thus, for example, if counter 20 uses the Gray code shown in FIG. 2, counter 30 may successively output the words in FIG. 2 having equivalent decimal values 1, 3, 5, 7, 9, 11, 13, 15, 1, etc., in response to successive RCLK signal pulses. For convenience herein the type of output sequence produced by counter 30 may sometimes be referred to as a "double-increment Gray code." (Again it will be remembered that whenever cleared, counter 30 clears to 0001.)

Counter 30 may be implemented in the same way that counter 20 is implemented. Like the outputs of counter 20, the outputs of counter 30 should be glitch-free. In the programmable logic device embodiment shown in FIG. 1, each of four appropriately programmed logic modules 32 produce a respective one of the double-increment Gray code bits on a respective one of leads 34.

The Gray code output signals of counter 20 are shifted into shift register circuitry 40 in synchronism with the WCLK signal. Shift register circuitry 40 preferably comprises four shift register subcircuits 42, one for each of the four outputs 24 of counter 20. Each shift register subcircuit 42 preferably includes a series of 16 latches (suggested in part by the dotted lines toward the left in each subcircuit 42 in FIG. 1). The latches in each of these series may sometimes be referred to as eight master latches interspersed with eight slave latches. The master latches receive and store data from the associated lead 24 or the preceding slave latch during one half of each WCLK signal cycle, and the slave latches receive and store data from the preceding master latch during the other half of each WCLK signal cycle. (In the example in which the LSB portion of counter 20 is clocked by the inverse of WCLK and the other portions of counter 20 are clocked by WCLK, it is desirable to clock the LSB portion of shift register circuitry 40 by WCLK and to clock the other portions of circuitry 40 by the inverse of WCLK. Consistent with this description, FIG. 1 shows circuitry receiving both the true and complement of WCLK, with the "0" logic module receiving the true WCLK signal and the "1–3" logic modules receiving the complement WCLK signal.) From the foregoing it will be seen that as counter 20 produces successive Gray code words, those words are taken into and shifted down through shift register circuitry 40.

In addition to the above-described ability to shift in and down signals received via leads 24, shift register circuitry 40 includes selection or decoding circuitry for selecting any master or slave latches and outputting via leads 50 the contents of the selected latches. This selection circuitry makes its selections based on the outputs of counter 30 received via leads 34.

Figure 3:
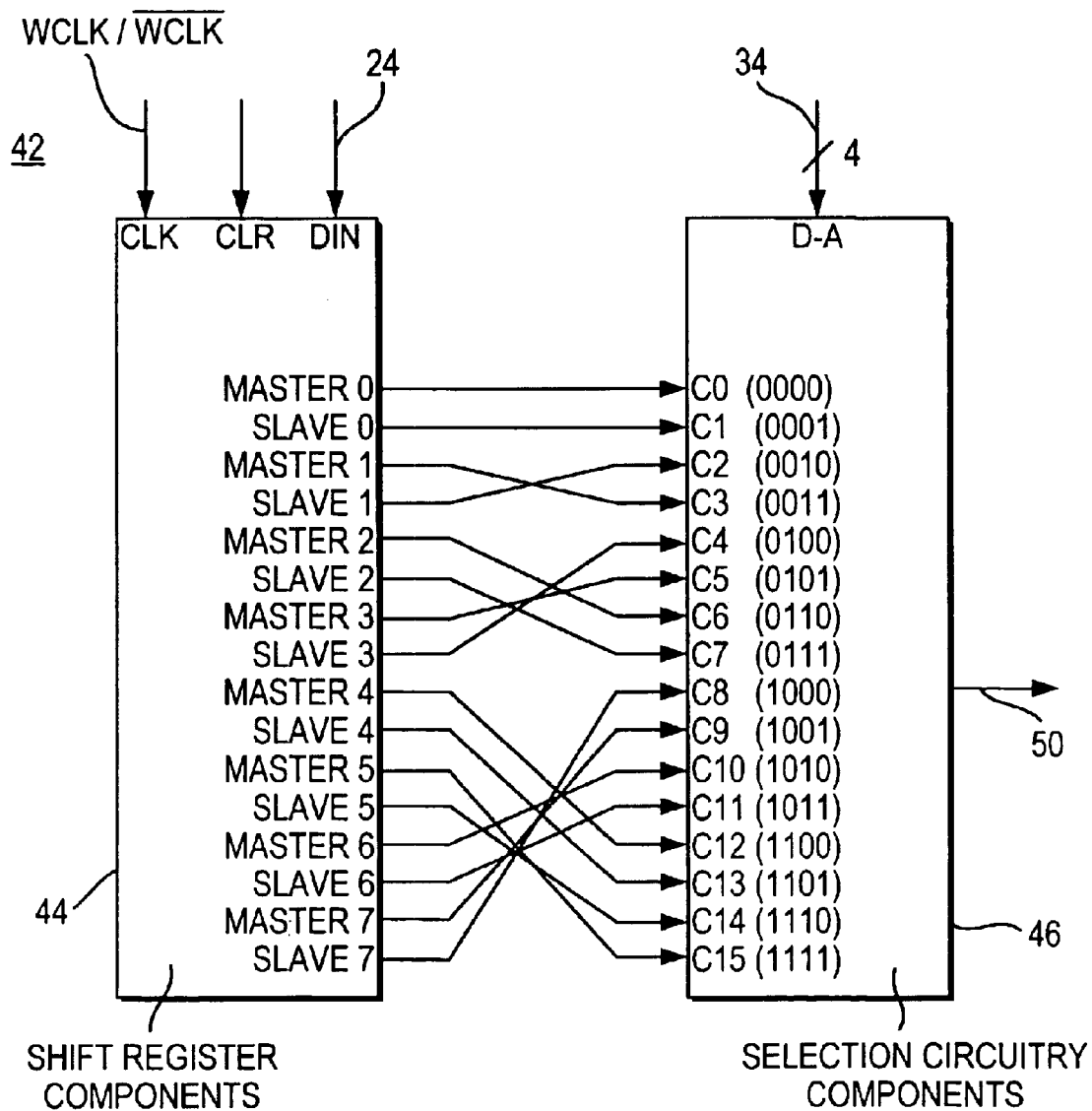
FIG. 3 is a more detailed but still simplified block diagram of an illustrative embodiment of a portion of the FIG. 1 circuitry in accordance with the invention.

FIG. 3 shows how a representative one of shift register subcircuits 42 may be constructed in the case in which the Gray code shown in FIG. 2 is used. As shown in FIG. 3, representative shift register subcircuit 42 includes shift register components 44 and selection circuitry components 46. Components 42 include the above-described series of eight master latches interspersed with eight slave latches. Data supplied via the associated lead 24 to the DIN input terminal is shifted down through these latches in synchronism with successive half cycles of the CLK signal. All of the latches may be cleared in parallel by asserting the CLR signal.

Selection circuitry 46 is a binary decoding tree for selecting one of inputs C0–C15 and basing output signal 50 on the selected input. The selection is based on a binary decode of the four inputs D–A from leads 34. For example, when inputs D–A have values 0000, input C0 is selected; when inputs D–A are 0001, input C1 is selected; when inputs D–A are 0010, input C2 is selected; and so on. In parentheses next to each input C0–C15 are the values of inputs D–A that cause selection of that input C0–C15.

The master and slave latch outputs MASTER 0 through SLAVE 7 are respectively connected to inputs C0–C15 in an order based on the same Gray code as is used by counter 20. The illustrative order of the connections shown in FIG. 3 is based on the Gray code shown in FIG. 2. In particular, this Gray code order of the FIG. 3 connections is such that successive D–A input words from leads 34 (also based on this Gray code) cause latches in circuitry 44 to be selected in the order that they appear in the shift register series. Bearing in mind that counter 30 outputs double-increment Gray code signals, the D–A signals may at some illustrative time change from 0001 to 0010 (i.e., from decimal equivalent value 1 in FIG. 2 to decimal equivalent value 3) in response to counting an RCLK pulse. This will cause circuitry 46 in FIG. 3 to switch from selecting the SLAVE 0 output of circuitry 44 to selecting the SLAVE 1 output of circuitry 44. The next RCLK pulse will cause signals D–A to switch from 0010 to 0111 (decimal value 5 in FIG. 2). This will cause circuitry 46 in FIG. 3 to switch from selecting the SLAVE 1 output of circuitry 44 to selecting the SLAVE 2 output of circuitry 44. Thus successive increases in the RCLK count output by counter 30 cause successive SLAVE latch outputs to be selected by circuitry 46 (looping back to SLAVE 0 after SLAVE 7 has been selected).

In general (and for the moment ignoring details that will be considered later), the contents of the slave latches in circuitry 44 are historical values of the WCLK count signals output by counter 20 in Gray code. A recent count value is stored in the lowest numbered slave latch (SLAVE 0), and earlier count values are stored in successively higher numbered slave latches. Assume for the moment that five WCLK signal pulses have been counted by counter 20 before the first RCLK signal pulse is counted by counter 30. The SLAVE 5 latches of circuitry 40 will be storing a Gray code value (0001) indicative of the state to which counter 20 is cleared, the SLAVE 4 latches will be storing a Gray code count (0010) indicative of one complete WCLK cycle (see FIG. 2 and remember that counter 20 counts at twice the WCLK rate), the SLAVE 3 latches will be storing a Gray code count (0111) indicative of two complete WCLK cycles, the SLAVE 2 latches will be storing 0100 indicative of three complete WCLK cycles, the SLAVE 1 latches will be storing 1101 indicative of four complete WCLK cycles, and the SLAVE 0 latches will be storing 1110 indicative of five complete WCLK cycles.

Prior to counting the first RCLK signal pulse, counter 30 outputs signals (0001) via leads 34 that cause circuitries 46 to select the SLAVE 0 outputs of the associated circuitries 44. Accordingly, shift register circuitry 40 will output (via leads 50) signals 1110. This indicates that WCLK is five cycles ahead of RCLK. Signals 50 are applied to full/empty detector circuitry 80, which is configured to detect signals 50 having values 0000 or 0001 as indicative of an empty condition, and to detect signals valued 1001 or 1000 as indicative of a full condition. Because signals 50 having values 1110 indicate neither of these memory capacity extremes, circuitry 80 produces neither a FULL output signal on lead 82 nor an EMPTY output signal on lead 84. Accordingly, both reading and writing are permitted to continue.

When the first RCLK pulse is counted by counter 30, circuitry 40 responds by switching to output the contents of the SLAVE 1 latches. In the example being discussed, this means that circuitry 40 now outputs 1101 via leads 50. This indicates that the WCLK count still exceeds the RCLK count by four, and so full/empty detector 80 still continues to permit reading and writing by outputting neither a FULL nor an EMPTY signal.

If the RCLK count eventually reaches five, circuitry 40 will output the contents of its SLAVE 5 latches (i.e., 0001 in the example being discussed). This will cause circuitry 80 to detect that reading has caught up with writing and that the FIFO is empty. Circuitry 80 produces an EMPTY output signal, which is used to inhibit further reading until after at least one further write operation (after which the EMPTY signal is again turned off).

If during the course of the example being discussed, further write operations occur, the WCLK values in the successive slave latches will increase, tending to widen the difference between the larger WCLK count read out from the slave latches selected by the smaller RCLK count. However, as soon as this difference becomes eight, circuitry 40 will output 1000. Circuitry 80 will recognize this as a full condition of the FIFO and will output a FULL signal to stop further write operations until at least one further read operation has relieved the FULL condition.

From the foregoing it will be seen that as counter 20 continues to count, all count values effectively recirculate through circuitries 44. These include values 0000 and 0001 (used by circuitry 80 to detect an empty condition) and values 1001 and 1000 (used by circuitry 80 to detect a full condition). As counter 30 also continues to count, the slave latch selection controlled by that count also recirculates (from the top slave latch (SLAVE 0), progressively down to the bottom slave latch (SLAVE 7), back to the top slave latch, and then progressively down to the bottom slave latch again). If reading is going too slowly relative to writing, the more rapid recirculation of the write count will cause the read count to eventually point to (i.e., select) the slave latches containing the values (e.g., 1000) that indicate a full condition. This will cause circuitry 80 to output a FULL signal. On the other hand, if writing is going too slowly relative to reading, the more rapid recirculation of the read count will cause the read count to eventually point to (i.e., select) the slave latches containing the values (e.g., 0001) that indicate an empty condition. This will cause circuitry 80 to output an EMPTY signal.

From the foregoing, it will be seen that circuitry 40 is effectively a subtractor operating on Gray code or Gray-code-based inputs. In particular, circuitry 40 effectively subtracts the Gray-code-based inputs on leads 34 from the Gray code inputs on leads 24. Circuitry 40 produces Gray code output signals indicative of the difference between these two groups of inputs, including outputs that indicate when the difference is either zero or an acceptable maximum. In view of its thus-described capabilities, circuitry 40 may be sometimes referred to as a Gray code subtractor.

Figure 4:
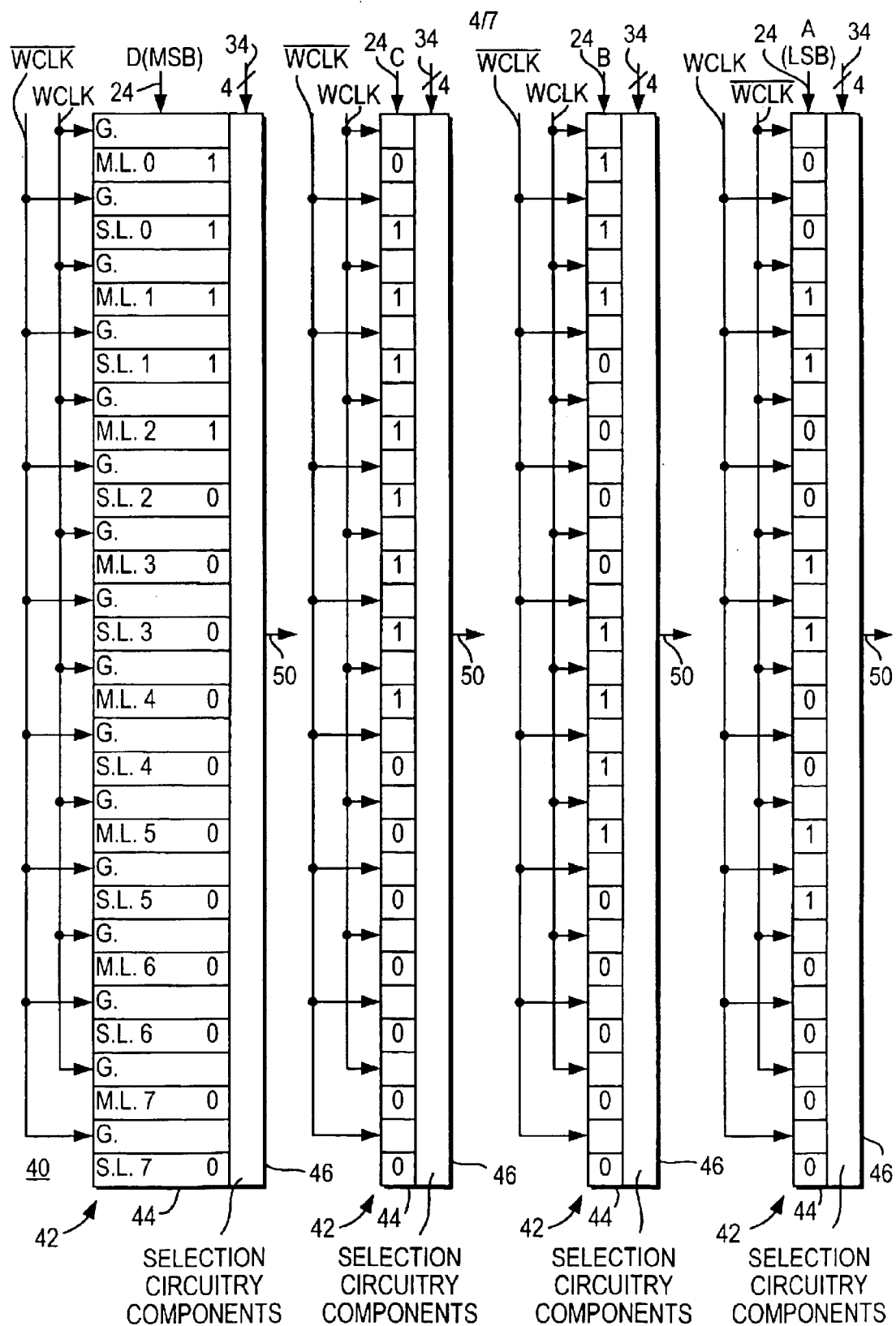
FIG. 4 is another more detailed but still simplified block diagram of an illustrative embodiment of a portion of the FIG. 1 circuitry in accordance with the invention.

The circuitry described above has the advantage of always being able to detect either a full or empty condition of the FIFO, even though the WCLK signal and the RCLK signal are not synchronized with one another. This is so because (1) counter 20 counts at twice the WCLK rate, (2) shift register circuitry 40 also shifts the output signals of counter 20 at twice the WCLK rate, and (3) there are two adjacent Gray code WCLK counts that are recognized by circuitry 80 as indicating a full condition, and two more adjacent Gray code WCLK counts that are recognized by circuitry 80 as indicating an empty condition. FIG. 4 can be used to help further illuminate these points.

FIG. 4 shows the shift register 40 portion of FIG. 1 in more detail. Each of subcircuits 42 in FIG. 4 includes the features shown in FIG. 3. FIG. 4 shows that the shift register portion 44 of each subcircuit includes a gate ("G.") before the first master latch ("M. L. 0") and between each master latch ("M. L.") or slave latch ("S. L.") and the succeeding master or slave latch. In each subcircuit 42 the gates G are divided into two interleaved groups. One group is controlled by the WCLK signal, and the other group is controlled by the WCLK bar (WCLK inverse) signal. The polarity of the application of the WCLK signal is reversed for the right-most subcircuit 42, which handles the LSB signal A from counter 20. Moving toward the left in FIG. 4, each succeeding subcircuit 42 handles the next more significant bit of the outputs of counter 20. The selection control circuitry 46 of each subcircuit 42 receives and is controlled by the four outputs of counter 30 on leads 34.

To provide a brief, illustrative example of the operation of the FIG. 4 circuitry, when WCLK goes high, the top-most gate G in the left-most subcircuit 42 is enabled. This allows M. L. 0 in that subcircuit to receive the signal on the associated lead 24 from counter 20. When the WCLK signal goes low, M. L. 0 latches in that signal from lead 24 and begins to apply that signal to S. L. 0 through the intervening gate G, which is now enabled by the WCLK bar signal. When WCLK goes high again, S. L. 0 latches in the signal it received from M. L. 0 and begins to apply that signal to M. L. 1 through the intervening gate G, which is now enabled by the WCLK signal. The top-most gate G is also enabled again so that M. L. 0 can receive the next counter 20 output value from the associated lead 24. In this way data shifts into and down through the shift register components 44 of each of the three left-most subcircuits 42 in synchronism with the WCLK bar signal and of the right-most subcircuit 42 in synchronism with the WCLK signal.

To facilitate further discussion, in FIG. 4 each master and slave stage box is shown containing the data that it contains at the start of the example discussed above in connection with FIG. 3. Down through S. L. 5 the data shown in FIG. 4 was output by counter 20 in response to five WCLK signal cycles.

Below S. L. 5 the data is all zeroes because the example being considered assumes that there was a clear operation, and circuitry 40 is cleared to zero as mentioned earlier in this specification.

Suppose now that just before the condition shown in FIG. 4 is reached, an RCLK pulse occurs which causes all the selection circuits 46 in FIG. 4 to switch from selecting the slave 4 latches to selecting the slave 5 latches. Suppose also that at about the same time a transition is occurring in the WCLK signal. (This is the WCLK transition that will actually result in the data pattern shown in FIG. 4.) If the RCLK pulse occurs before the WCLK transition, the slave 5 latches will still contain 0000 when the RCLK pulse occurs. If the RCLK pulse occurs after the WCLK transition, the slave 5 latches will contain 0001 when the RCLK pulse occurs. Circuitry 80 (FIG. 1) recognizes either 0000 or 0001 as indicating an empty condition. Accordingly, circuitry 80 produces a stable and glitch-free EMPTY output signal even though WCLK and RCLK are not synchronized with one another and even though a WCLK signal transistion may be occurring at about the same time as an RCLK signal pulse is occurring. (As a practical matter, shift register 44 executes a data shift more rapidly than selection circuitries 46 can change output state.) Thus an empty condition can always be reliably detected even though there is no synchronization between WCLK and RCLK. Moreover, the same principles apply to detection of a full condition, so that a full condition is also detected as reliably as an empty condition.

If the invention is being implemented in a programmable logic device, it can be particularly helpful to use programmable logic device circuitry of the type shown in above-mentioned application Ser. No. 09/761,602, now U.S. Pat. No. 6,411,124. This is so because that reference shows programmable logic device logic modules that can perform all the functions performed by subcircuits 42 herein. In particular, all the functions performed by one subcircuit 42 herein can be performed in one logic module in the last-mentioned reference. In addition, the last-mentioned reference includes clock signal handling capabilities associated with each group or block of logic modules that facilitate including all the circuitry in FIG. 4 in one block of logic modules. One logic module in the block can receive a normal clock signal (like that needed by the right-most subcircuit 42 in FIG. 4) while other logic modules receive an inverted version of that same clock signal. The circuitry shown in the last-mentioned reference also facilitates stringing together the shift register capabilities of logic modules so that if shift registers longer than those employed in the examples described herein are needed, such longer shift registers can be readily provided.

Figure 5:
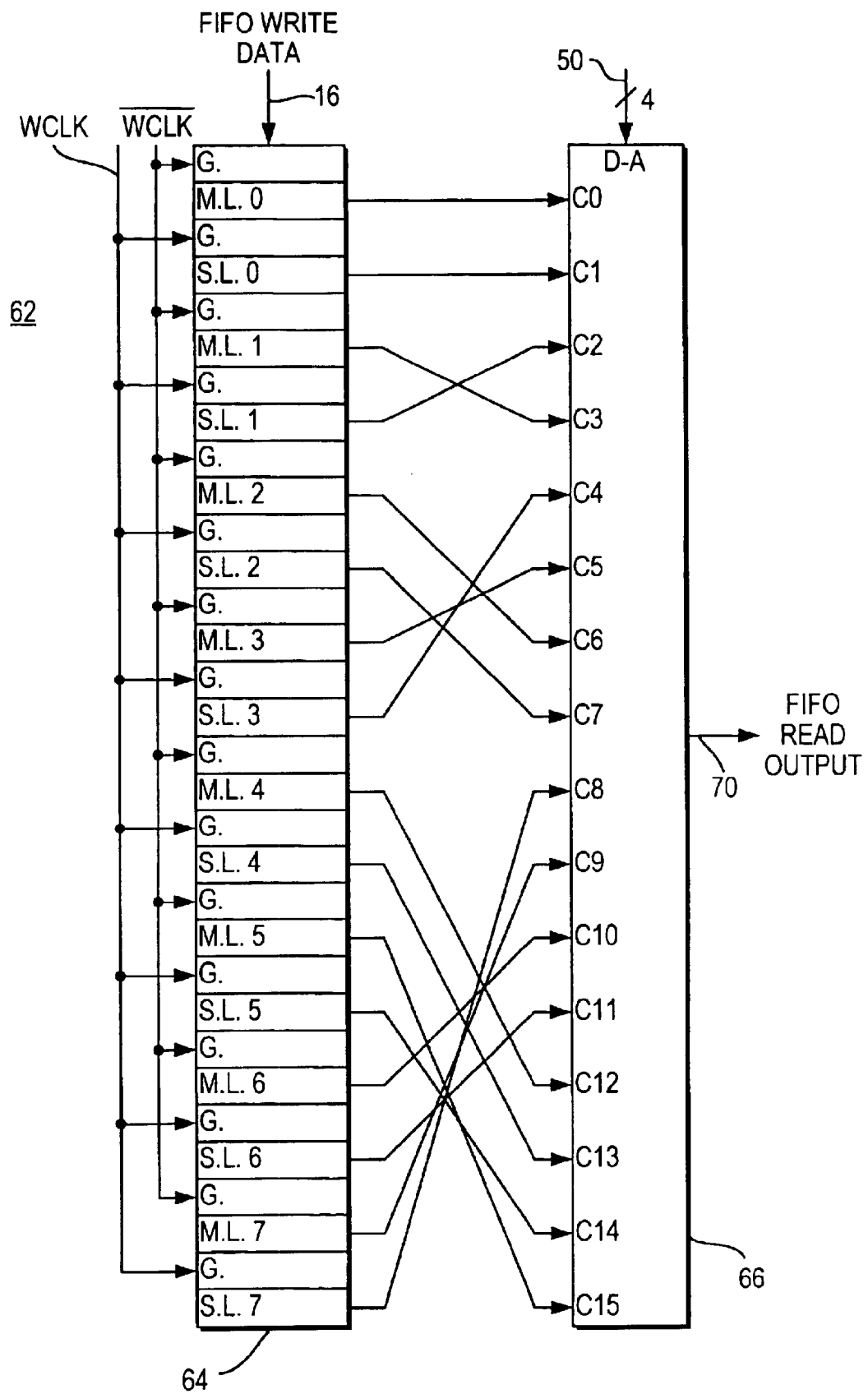
FIG. 5 is a more detailed but still simplified block diagram of an illustrative embodiment of another portion of the FIG. 1 circuitry in accordance with the invention.

Returning again to FIG. 1, the FIFO data storage portion of memory 10 is shift register circuitry 60. Like shift register circuitry 40, circuitry 60 is shown as made up of a plurality of shift register subcircuits 62, each of which may be similar to any one of the subcircuits 42 of circuitry 40. Thus each of subcircuits 62 is preferably constructed as shown for subcircuits 42 in FIGS. 3 and 4. Because circuitry 60 is designed to store and output eight-bit data words, circuitry 60 includes eight subcircuits 62. A representative one of subcircuits 62 is shown in more detail in FIG. 5.

Each of subcircuits 62 receives a respective one of the eight bits of the FIFO WRITE DATA via a respective one of leads 16. Similarly, each of subcircuits 62 outputs a respective one of the eight bits of the FIFO READ OUTPUT via a respective one of leads 70. Circuitry 60 shifts in the FIFO WRITE DATA in synchronism with the WCLK signal. Circuitry 60 outputs FIFO READ OUTPUT from master or slave latches of subcircuits 62 that are currently being selected in response to the selection control signals currently being output (via leads 50) by Gray code subtractor 40. Storing data in circuitry 60 is straightforward and does not require any significant further discussion. Reading data from circuitry 60 is somewhat more subtle and will now be considered in more detail.

Because WCLK is not synchronized with RCLK, the output of Gray code subtractor 40 can be any of the 16 Gray code values output by counter 20. Even though counter 30 can only cause the contents of slave latches in circuitry 40 to be read out via leads 50, all 16 Gray code outputs of counter 20 are eventually shifted through each set of slave latches in circuitry 40. Just as there are two adjacent Gray code values associated with each of the full and empty conditions, there are two adjacent Gray code values associated with each FIFO WRITE DATA word (because counter 20 counts at twice the WCLK rate). Each FIFO WRITE DATA word will also be stored in at least one of two adjacent sets of latches (one master latch set and one slave latch set) in circuitry 60 at any given time. (Indeed, for most of each WCLK cycle (and each WCLK bar cycle) each FIFO WRITE DATA word will be stored in two adjacent sets of latches in circuitry 60.) Moreover, shifting of the Gray code data in the shift register portions 44 of circuitry 40 occurs in synchronism with shifting of data in the shift register portions 64 of circuitry 60.

As will be apparent from the foregoing discussion, when an RCLK pulse occurs, circuitry 40 switches to outputting the contents of the slave latches in circuitry 40 that contain the oldest previously unread Gray code count from counter 20. This will be the location (in Gray code) of the oldest previously unread FIFO WRITE DATA word in circuitry 60. If a WCLK transition occurs at about the time that a read event is taking place, both the Gray code count information in circuitry 40 and the FIFO WRITE DATA in circuitry 60 will shift by one latch. Thus circuitry 60 will continue to output the correct FIFO DATA OUTPUT even though the WCLK and RCLK are not synchronized with one another.

Figure 6:
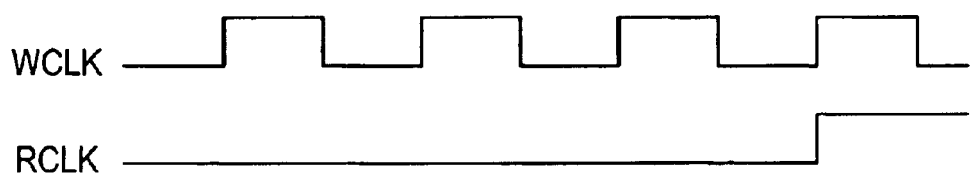
FIG. 6 is a chart that is useful in explaining certain aspects of the operation of the circuitry of the invention.

FIG. 6 is a further illustration of the point just stated. FIG. 6 shows the shifting of successive FIFO WRITE DATA words D0, D1, D2, etc., into the master and slave latches of the shift register portions 64 of subcircuits 62 in circuitry 60 (FIGS. 1 and 5) in synchronism with the WCLK signal. For example, the first FIFO WRITE DATA word D0 is present in master latch 0 during the initial low half-cycle of WCLK. When WCLK thereafter goes high, D0 is latched into master latch 0 and is also applied to slave latch 0. When WCLK subsequently goes low again, D0 is latched into slave latch 0 and applied to master latch 1. At the same time, the next FIFO WRITE DATA word D1 is applied to master latch 0. Data intake and shifting continues in this manner in synchronism with further WCLK signal cycles.

Assuming (as shown toward the left in FIG. 6) that during the initial few of the depicted WCLK signal cycles the RCLK signal does not change state, then circuitry 60 will select and output data from the latch locations indicated by the shaded upper right-hand corners in FIG. 6. This is so because the output of counter 30 is constant, thereby pointing constantly to one set of slave latches in circuitry 40, but the Gray code counter 20 count information in circuitry 40 is advancing in synchronism with WCLK. This means that the output signals 50 of circuitry 40 are also an advancing Gray code sequence synchronized with WCLK, which causes the selection circuitries 66 in circuitry 60 to select successive sets of latches in that circuitry at the same rate that the FIFO WRITE DATA is being shifted through those latches. Circuitry 60 therefore continuously outputs D0 during the initially constant portion of the RCLK signal trace shown in FIG. 6. (In this connection it is again noted that circuitry 60 can execute a shift of data from one latch to the next faster than the outputs of its selection circuitry components 66 can change state. This helps maintain a constant D0 output 70 in the example being described.)

Toward the right in FIG. 6 RCLK becomes logic 1, indicating that it is now desired to read the oldest previously unread FIFO WRITE DATA in circuitry 60. If, in a worst-case situation depicted in FIG. 6, this RCLK event occurs at about the same time as a WCLK event, the FIFO WRITE DATA may be shifting in circuitry 60 just when it is desired to read data from that circuitry. Because of the way the circuitry is constructed and operates, however, this will not matter. If the FIFO WRITE DATA shifts before the read pointer (on leads 50) increments, the D0 data will be read from the master 3 latches of circuitry 60 as indicated at "b" in FIG. 6. On the other hand, if the read pointer (on leads 50) has incremented when the FIFO WRITE DATA shifts, the same D0 data will be read from the slave 3 latches of circuitry 60 as indicated at "a" in FIG. 6. This further demonstrates the ability of the circuitry of this invention to operate without synchronism of the WCLK and RCLK signals.

Once again, if the invention is being implemented in a programmable logic device, it can be particularly helpful to use programmable logic device circuitry of the type shown in above-mentioned application Ser. No. 09/761,602, now U.S. Pat. No. 6,411,124, because (as has been mentioned) that circuitry includes logic modules that can readily perform all the functions required of subcircuits 62 herein. In particular, each subcircuit 62 can be implemented in one logic module in the last-mentioned reference. In addition, the last-mentioned reference shows circuitry that facilitates stringing together the shift register capabilities of logic modules if longer shift registers are needed to provide deeper FIFO memories (i.e., FIFO memories with capacity for more data words).

Figure 7:
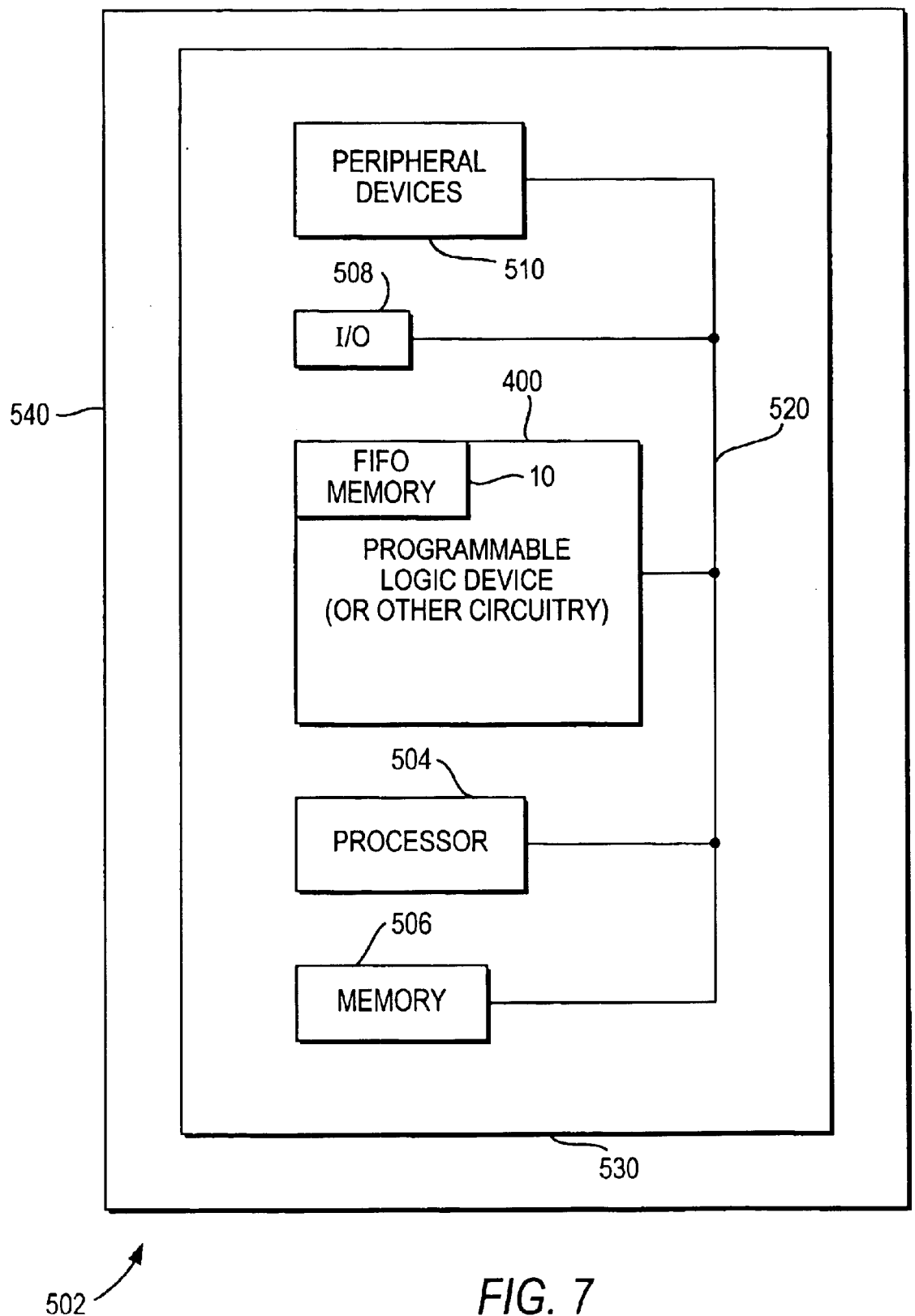
FIG. 7 is a simplified block diagram of an illustrative system employing circuitry in accordance with the invention.

FIG. 7 illustrates FIFO memory 10 in accordance with this invention in a larger system 502 such as a data processing system. FIG. 7 shows the circuitry 10 of this invention implemented in programmable logic device ("PLD") 400 (although it will be understood that circuitry 10 could be alternatively implemented in other ways such as in special-purpose circuitry). System 502 may include one or more of the following components: a processor 504; memory 506; I/O circuitry 508; and peripheral devices 510. These components are coupled together by a system bus 520 and are populated on a circuit board 530 which is contained in an end-user system 540.

System 502 can be used in a wide variety of applications, such as computer networking, data networking, instrumentation, video processing, digital signal processing, or any other application where the advantage of using FIFO memory circuitry 10 of the type shown herein is desirable. Programmable logic device 400 can be used to perform a variety of different logic functions. For example, programmable logic device 400 can be configured as a processor or controller that works in cooperation with processor 504. Programmable logic device 400 may also be used as an arbiter for arbitrating access to a shared resource in system 502. In yet another example, programmable logic device 400 can be configured as an interface between processor 504 and one of the other components in system 502. It should be noted that system 502 is only exemplary, and that the true scope and spirit of the invention should be indicated by the following claims.

It will be understood that the foregoing is only illustrative of the principles of the invention and that various modifications can be made by those skilled in the art without departing from the scope and spirit of the invention. For example, different Gray codes can be used if desired. Similarly, FIFO memories of different depths (i.e., data word capacities) and/or widths (i.e., data word lengths) can be constructed using the principles of the invention. Also, different clocking arrangements can be used, with different preset states of counters 20 and 30.

What is claimed is:

1. First-in/first-out memory circuitry comprising:
    first and second Gray code counter circuitries respectively counting write and read clock signals;
    Gray code subtractor circuitry subtracting counts provided by the counter circuitries; and
    shift register circuitry shifting in write data words in synchronism with the write clock signal and outputting one of those data words selected based on subtraction information from the subtractor circuitry, wherein:

the first counter circuitry counts at twice the write clock rate and the second counter circuitry counts in double increments of the Gray code.

2. The memory circuitry defined in claim 1 further comprising:
detector circuitry configured to detect predetermined subtraction information to indicate that a predetermined capacity condition of the shift register circuitry has been reached.

3. The memory circuitry defined in claim 1 wherein the capacity condition is an empty condition.

4. The memory circuitry defined in claim 2 wherein the capacity condition is a full condition.

5. The memory circuitry defined in claim 1 wherein the subtractor circuitry comprises:
second shift register circuitry shifting in count information from the first counter circuitry; and
selection circuitry selecting count information from the second shift register circuitry based on count information from the second counter.

6. The memory circuitry defined in claim 5 wherein the selection circuitry is configured to decode the count information from Gray code.

7. The memory circuitry defined in claim 1 wherein the shift register circuitry comprises:
shift register components shifting in the write data words; and
selection circuitry selecting a data word from the shift register components based on the subtraction information.

8. The memory circuitry defined in claim 7 wherein the selection circuitry is configured to decode the count information from Gray code.

9. The memory circuitry defined in claim 1 wherein the shift register circuitry comprises:
a series of alternating master and slave latch circuitries configured to transfer write data words from each master latch circuitry to a succeeding slave latch circuitry and to alternately transfer write data words from each slave latch circuitry to a succeeding master latch circuitry during each cycle of the write clock signal.

10. The memory circuitry defined in claim 9 wherein the shift register circuitry further comprises:
selection circuitry configured to selectively output a data word from any of the master and slave latch circuitries.

11. The memory circuitry defined in claim 5 wherein the second shift register circuitry comprises:
a series of alternating master and slave latch circuitries configured to transfer count information from each master latch circuitry to a succeeding slave latch circuitry and to alternately transfer count information from each slave latch circuitry to a succeeding master latch circuitry during each cycle of the write clock signal.

12. The memory circuitry defined in claim 11 wherein selection circuitry is configured to select count information from any of the slave latch circuitries.

13. A programmable logic device including memory circuitry as defined in claim 1.

14. A data processing system comprising:
processor circuitry; and
memory circuitry as defined in claim 1 coupled to the processor circuitry.

15. A printed circuit board on which is mounted memory circuitry as defined in claim 1.

16. The printed circuitry board defined in claim 15 on which is further mounted processor circuitry coupled to the memory circuitry.

17. First-in/first-out memory circuitry comprising:
write counter circuitry configured to count, in a Gray code, half cycles of a write clock signal that is synchronized with successive write data words;
read counter circuitry configured to count, in double increments of the Gray code, a read clock signal;
first shift register circuitry configured to shift in Gray code count data produced by the write counter and to output a Gray code count selected based on double-increment count data produced by the read counter circuitry; and
second shift register circuitry configured to shift in write data words in synchronism with the write clock signal and to output a write data word selected based on the Gray code count output by the first shift register circuitry.

18. The memory circuitry defined in claim 17 further comprising:
detector circuitry configured to compare the Gray code count output by the first shift register circuitry to a predetermined count indicative of a particular capacity condition of the second shift register circuitry.

19. The memory circuitry defined in claim 18 wherein the capacity condition is an empty condition.

20. The memory circuitry defined in claim 18 wherein the capacity condition is a full condition.

21. The memory circuitry defined in claim 17 wherein the first shift register circuitry comprises:
shift register components shifting in the Gray code count data; and
selection circuitry selecting Gray code count data in the shift register components based on Gray code decoding of the double-increment count data.

22. The memory circuitry defined in claim 21 wherein the shift register components comprise:
a series of alternating master and slave latch circuitries configured to transfer Gray code count data from each master latch circuitry to a succeeding slave latch circuitry and to alternately transfer Gray code count data from each slave latch circuitry to a succeeding master latch circuitry during each cycle of the write clock signal.

23. The memory circuitry defined in claim 22 wherein the selection circuitry is configured to select Gray code count data in any of the slave latch circuitries.

24. The memory circuitry defined in claim 17 wherein the second shift register circuitry comprises:
shift register components shifting in the write data words; and
selection circuitry selecting a write data word in the shift register components based on Gray code decoding of the Gray code count output by the first shift register circuitry.

25. The memory circuitry defined in claim 24 wherein the shift register components comprise:
a series of alternating master and slave latch circuitries configured to transfer write data words from each master latch circuitry to a succeeding slave latch circuitry and to alternately transfer write data words from each slave latch circuitry to a succeeding master latch circuitry during each cycle of the write clock signal.

26. The memory circuitry defined in claim 25 wherein the selection circuitry is configured to select a write data word in any of the master and slave latch circuitries.

27. Gray code subtractor circuitry comprising:
shift register circuitry receiving and shifting in a first data signal sequence based on a Gray code; and
decoder circuitry receiving a second data signal sequence based on a double-increment Gray code and selecting for output a first data signal in the shift register circuitry based on the second data signal.

28. The circuitry defined in claim 27 further comprising:
first circuitry configured to produce the first data signal sequence.

29. The circuitry defined in claim 28 further comprising:
second circuitry configured to produce the second data signal sequence.

30. The circuitry defined in claim 29 wherein the first circuitry is configured to produce the first data signal sequence in synchronism with a first clock signal, and wherein the second circuitry is configured to produce the second data signal sequence in synchronism with a second clock signal.

31. The circuitry defined in claim 30 wherein the first circuitry is configured to produce successive Gray code data signals in response to each successive half-cycle of the first clock signal.

32. The circuitry defined in claim 31 wherein the second circuitry is configured to produce successive double-increment Gray code data signals in response to each successive cycle of the second clock signal.

33. The circuitry defined in claim 27 further comprising:
first circuitry configured to produce signals having a Gray code sequence as the first data signal sequence; and
second circuitry configured to produce signals having a double-increment Gray code sequence as the second data signal sequence.

* * * * *